(12) United States Patent
Austin

(10) Patent No.: US 6,669,827 B2
(45) Date of Patent: Dec. 30, 2003

(54) SYSTEMS AND METHODS FOR AFFECTING THE ULTRA-FAST PHOTODISSOCIATION OF WATER MOLECULES

(75) Inventor: Gary N. Austin, Lemon Grove, CA (US)

(73) Assignee: Austin & Neff, L.L.C., Tulsa, OK (US)

( * ) Notice: Subject to any disclaimer, the term of this patent is extended or adjusted under 35 U.S.C. 154(b) by 0 days.

(21) Appl. No.: 10/065,429

(22) Filed: Oct. 16, 2002

(65) Prior Publication Data

US 2003/0024805 A1 Feb. 6, 2003

Related U.S. Application Data

(63) Continuation-in-part of application No. 09/883,169, filed on Jun. 18, 2001, now abandoned.

(51) Int. Cl.⁷ .................................. C25B 9/00
(52) U.S. Cl. ................. 204/270; 204/274; 204/275.1; 204/276; 204/278
(58) Field of Search ................. 204/266, 274, 204/276, 278, 275.1, 270; 205/628

(56) References Cited

U.S. PATENT DOCUMENTS

| | | | |
|---|---|---|---|
| 3,925,212 A | * 12/1975 | Tchernev | 250/527 |
| 4,094,751 A | 6/1978 | Nozik | 205/638 |
| 4,107,008 A | 8/1978 | Horvath | |
| 4,121,984 A | 10/1978 | Gomberg et al. | |
| 4,169,030 A | * 9/1979 | Gray et al. | 204/157.1 R |
| 4,233,127 A | * 11/1980 | Monahan | 204/157.1 R |
| 4,342,738 A | * 8/1982 | Burgund | 423/579 |
| 4,622,115 A | 11/1986 | O'Neill | 204/157.41 |
| 4,755,269 A | 7/1988 | Brumer et al. | 204/157.4 |
| 4,957,610 A | 9/1990 | Hawkins | 205/340 |
| 5,711,770 A | 1/1998 | Malina | |
| 6,063,258 A | 5/2000 | Sayama et al. | 205/637 |

OTHER PUBLICATIONS

Sander, Luther, Troe, "Excitation Energy Dependence of the Photoionization of Liquid Water," J. Phys. Chem., p. 11489, (N.M.) (1993).

Kantor, Long, Micci, "Molecular Dynamics Simulation of Dissociation Kinetics," AIAA Aero. Sci. mtg. No. 2000–0213, (N.M.) (2000).

Miller, "Photophysics and Energy Thresholds," Electronic Computational Chemistry Conf., Apr. 2–30 (2001).

Norizawa, Yada, Ikeya, "Does Liquid Water Have Traces of Irradiation . . . " Advances in ESR Appl., vol. 18 pp 233–37 (N.M.) (2002) .

Perreault, "The Dissociation of Water by Radiant Energy" No Power Technologies, Rumney, NH. (N.M.) (1999) .

* cited by examiner

Primary Examiner—Donald R. Valentine
(74) Attorney, Agent, or Firm—Clifford B. Perry

(57) ABSTRACT

An ultra fast photodissociation system includes a water acidifier, a water vaporizer, and a photolysis cell. The water acidifier is connected in fluid communication with a water supply, and is operable to acidify the supplied water to produce acidic water. The water vaporizer is connected in fluid communication with the water acidifier to receive the acidic water, and is configured to convert the received acidic water into acidic water vapor. The photolysis cell is connected in steam communication with the water vaporizer to receive the acidic water vapor, and is operable to dissociate the acidic water vapor into $H_2$ and $O_2$ gas.

25 Claims, 4 Drawing Sheets

SYSTEMS AND METHODS FOR AFFECTING THE ULTRA-FAST PHOTODISSOCIATION OF WATER MOLECULES

CROSS REFERENCE TO RELATED APPLICATIONS

This application is a continuation-in-part application of U.S. patent application Ser. No. 09/883,169 entitled "PHD Header for the Production of Hydrogen Gas and Oxygen Gas from Seawater, with Advanced Steam Photolysis," filed Jun. 18, 2001, now abandoned the contents of which are herein incorporated by reference.

BACKGROUND OF INVENTION

This invention relates to photodissociation processes in general, and to components, systems, and methods for affecting the ultra fast dissociation of a water molecule in particular.

Photodissociation of the water molecule $H_2O$ has been shown in the prior art using various approaches including catalysts, ultraviolet light, superheated steam and solar pumped lasers. Also described are systems employing photo-chemical diodes, photo-voltaics, and various vessel configurations. Problems involved in these prior art systems have included volatility of hydrogen when obtained from superheated steam, excessive costs in systems using ultraviolet light sources, material and maintenance costs of systems employing catalysts, and the lack of gas purity in the gas separation process.

What is therefore needed are systems and methods for water molecule dissociation which provides lower gas volatility, higher gas purity, with lower equipment and maintenance costs.

SUMMARY OF INVENTION

The present invention provides systems and methods for the ultra fast dissociation of the water molecule at relatively low temperatures (typically between 120–210° C.), and at higher purity. The present invention further provides for the use of lower cost, near infrared light sources can be used dissociate the water molecule, and radiolysis techniques which can be used to further increase dissociation efficiency and gas purity.

In one embodiment of the invention, an ultra fast photodissociation system is presented comprising a water acidifier, a water vaporizer, and a photolysis cell. The water acidifier is connected in fluid communication with a water supply, and is operable to acidify the supplied water to produce acidic water. The water vaporizer is connected in fluid communication with the water acidifier to receive the acidic water, and is configured to convert the received acidic water into acidic water vapor. The photolysis cell is connected in steam communication with the water vaporizer to receive the acidic water vapor, and is operable to dissociate the acidic water vapor into $H_2$ and $O_2$ gas.

In a second embodiment of the invention, a photolysis cell is presented which is operable to dissociate water molecules into $H_2$ and $O_2$ gas. The photolysis cell includes one or more photolysis bottles, each photolysis bottle having an inlet configured to receive water molecules, an $H_2$ outlet configured to output $H_2$ gas, and a $O_2$ outlet configured to output $O_2$ gas. Each photolysis bottle further includes an undulated bottle wall defining an interior region of the photolysis bottle, and an optically reflective coating disposed on the undulated bottle wall. The deposited optically reflective coating operates to reflect light back within the interior region of the photolysis bottle, and to effectively reduce the wavelength of the light reflected therefrom.

Other advantages and aspects of the invention will be obtained from studying the following drawings and detailed description.

Figure 1A:
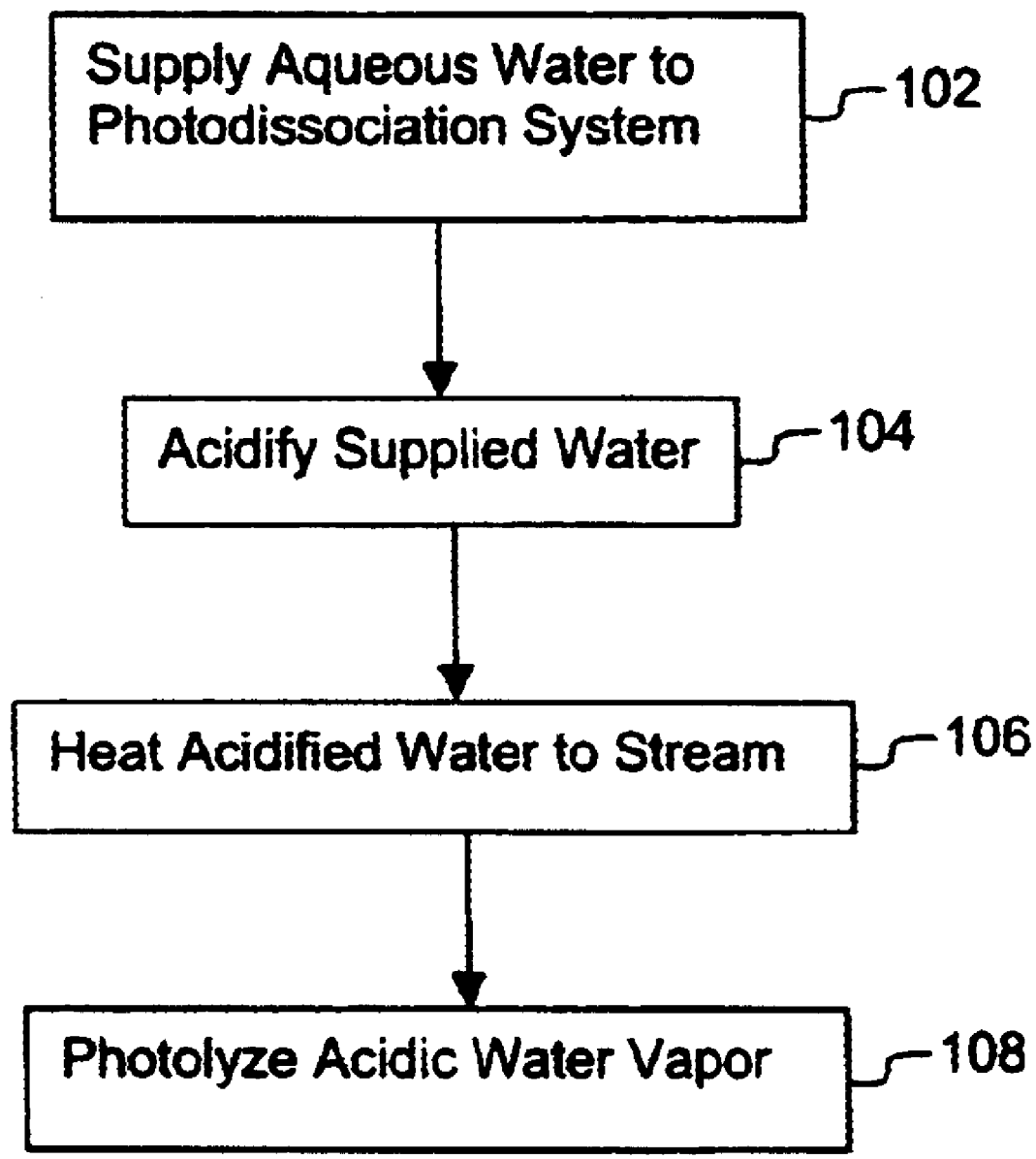
FIG. 1A shows a method employing ultra fast dissociation of water molecules in accordance with the present invention.

For clarity, previously described features are identified by their original reference numerals.

DETAILED DESCRIPTION

The energy required to dissociate the water molecule has previously been cost prohibitive to obtain hydrogen as a fuel, as the energy required to produce the $H_2$ fuel has been greater than the energy provided by the $H_2$ fuel produced. The present invention now describes a system which utilizes molecular water in a controlled state, specifically acidic water vapor, to more efficiently produce $H_2$ fuel. Acidic water, which includes the proton acid $H_3O^+$, is vaporized to produce the dihydronium molecule $H_5O_2$. The dihydronium molecule $H_5O_2$ requires much less energy to split compared to $H_2O$, as the dihydronium molecule presents a much larger target for photodissociation, and its bonds lengths are stretched in its vapor phase state.

Previous drawbacks of photodissociation systems have included the almost immediate recombination of the $H_2$ and $O_2$ constituents. The present invention employs a radiolysis approach in which the $H_2$ and $O_2$ constituents are bombarded with RF frequency ionizing radiation to inhibit their recombination, thereby resulting in higher conversion efficiency.

Additionally, the new photolysis cell presented herein has the capability of employing much smaller and cheaper near-IR light sources compared to UV sources used in conventional photodissociation systems. The new photolysis cell uses a lensing refraction arrangement in which an undulated surface on the photolysis cell wall is coated with an optically reflective material, the arrangement effectively reducing the wavelength of a near-infrared laser to the UV range. These and other features of the present invention will now be described in conjunction with the identified drawings below.

I. Photodissociation Methodology and Exemplary System

FIG. 1A illustrates a method for affecting the ultra fast photodissociation of a water molecule in accordance with one embodiment of the present invention. Initially at 102, aqueous water is supplied to a photodissociation system, an embodiment of which is shown and described in FIG. 1B below. The supplied water may be from any source, such as a well, a lake, or an ocean as will be described further below. Next at 104, the supplied water is acidified. The process may include using a reverse osmosis process, or a similar technique to lower the water's pH. The water's pH may be reduced to within a range of 1.5 to 6.9, more preferably within a range of 3.0 to 5.5, and even more preferably within a range of 4.0 to 5.0. In the instance in which the supplied water is already acidic, this process may not be required, or the process may be scaled back to add the acidity level desired.

Subsequently at 106, the acid water is heated and converted into an acidic water vapor, most preferably between the temperatures of 120 and 210° C. Producing water vapor at this relatively low temperature provides advantages, as the $H_2$ gas is much more stable, and subsequent processing equipment operates at reduced temperatures, lowering their cost and extending their life cycles. Finally at 108, the acidic water vapor is photolyzed into $H_2$ and $O_2$ gas, the process of which is further described below.

Figure 1B:
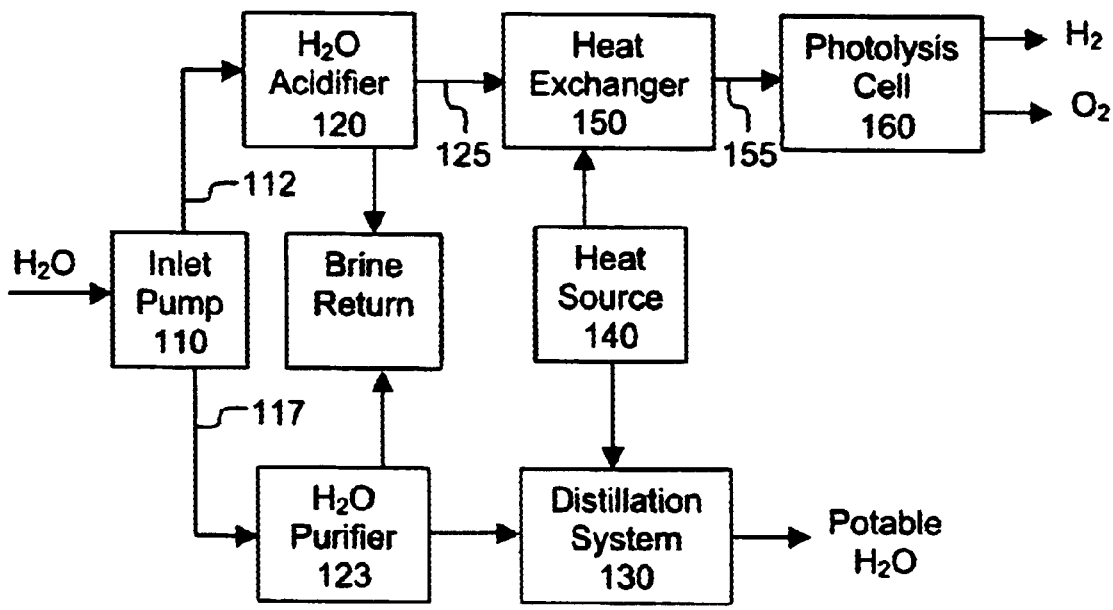
FIG. 1B shows a simplified block diagram of a photodissociation system employing the ultra fast dissociation method illustrated in FIG. 1A in accordance with the present invention.

FIG. 1B shows a simplified block diagram of a photodissociation system employing the method illustrated in FIG. 1A. The exemplary system illustrates a combined photolysis/water distillation system and includes a pump 110, a water acidifier 120, a water purifier 123, a distillation system 130, a heat source 140, a heat exchanger 150, and a photolysis cell 160.

Initially in the process, water, (e.g., seawater) is supplied to the system through an inlet using a pump 110. A portion of the pumped water is output to the distillation branch (potable water) and a second portion supplied to the photolysis system. The distillation branch includes a water purifier 123 and a distillation system 130 operable to remove impurities and reduce the water's salinity to potable levels. In one embodiment, a reverse osmosis filtration system functions as the water purifier 123, and a heat exchanger is employed as the distillation system 130.

The photolysis branch includes a water acidifier 120, which, in one embodiment, is a reverse osmosis filtration system. In a specific embodiment, the supplied seawater is passed through the reverse osmosis membrane twice to remove impurities, salt, and lower the pH of the resulting water to approximately 4.5. The resulting water consists of $H_3O^+$ (proton acid), herein referred to as "acidic water" 125. The acidic water 125 is supplied to a heat exchanger 150, which produces steam, herein referred to as an "acidic water vapor" 155. The heat exchanger 150 may be supplied heat from any conventional heat source, and in a specific example, natural gas-fueled molten carbonate fuel cells are used. In such an embodiment, the molten carbonate fuel cells power one or more components of the system 100, and the by-product heat generated by the fuel cells is supplied to the heat exchanger 150 to produce the acidic water vapor 155. Of course, other heat sources may be used alternatively or in addition in other embodiments of the present invention.

The acidic water vapor 155 includes $H_5O_2$ dihydronium radical ions, which, as noted above, are much more efficiently dissociated. The acidic steam 155 is supplied to a photolysis cell 160 which is operable to convert the acidic water vapor 155 to hydrogen gas $H_2$ and oxygen gas $O_2$. Several embodiments of the photolysis cell are described in greater detail below.

In a specific embodiment, the described system 100 is a high capacity system operable to produce 20,000 moles/minute of $H_2$ fuel. In this embodiment, the pump 110 is a high capacity pump operable to supply on the order of 10 million gallons of seawater per day, examples of which are available from the Liquid Handling Systems Corporation of Santa Ana, Calif. The water acidifier 120 and water purifier 123 are reverse osmosis filtration systems operable to process 5 MGD permeate (50% recovery), such as units available from Koch Membrane Systems, Inc. of San Diego, Calif. The heat source 140 is one or more molten carbonate fuel cells operable to generate approximately 250 kW of power, and operate at around 1200° C. Exemplary units are available from FuelCell Energy, Inc. of Danbury, Conn. The heat exchanger 150 is operable to produce the acidic water vapor at between 120–210° C. between 7–10 psi (0.5–0.7 bar); Tranter, Inc. of Wichita Falls, Tex. manufactures exemplary units. Those skilled in the art will appreciate that the present invention is not limited to a system of any particular scale, and systems of smaller or larger size may be constructed under alternative embodiments.

II. Photolysis Cell

The photolysis cell is operable to dissociate $H_2$ and $O_2$ from the acidic water or water vapor molecules contained therein. The preferred embodiment of the photolysis cell includes a wavelength conversion process by which an optically reflective coating and a corrugated reflective bottle wall are used to convert light of wavelengths longer than 246 nm to light at or below 246 nm, 246 nm representing the wavelength threshold for dissociating water molecules on a one photon per molecule basis. Radiolysis is additionally used to inhibit $H_2$ and $O_2$ recombination by maintaining these constituents in a charged state with ionizing radiation. These and other features are further illustrated in the figures presented herein.

Figure 2:
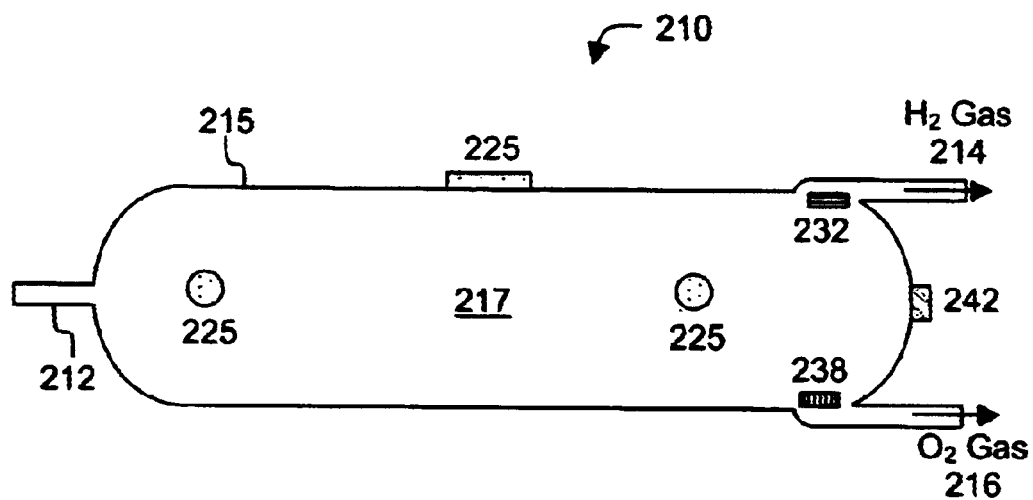
FIG. 2 illustrates a single stage photolysis cell in accordance with one embodiment of the present invention.

FIG. 2 illustrates a single-stage photolysis cell 200 in accordance with one embodiment of the present invention. The photolysis cell 200 includes a photolysis bottle 210 having an inlet 212 configured to receive water molecules, an $H_2$ outlet 214 configured to output $H_2$ gas, and an $O_2$ outlet 216 configured to output $O_2$ gas. The photolysis bottle 210 has an interior region 217 defined by a bottle wall 218 having an inner surface 213 and an outer surface 215. In a specific embodiment, the photolysis bottle 210 is generally cylindrical in shape with parabolic-shaped ends, has a volume of 0.5–3 liters, and is constructed from fused quartz silica, although bottles of other shapes, volumes, and composition may be used in alternative embodiments. In the preferred embodiment, the photolysis cell inlet is configured to receive acidic water vapor, although in an alternative embodiment, liquid phase water may be supplied and converted into a vapor within the photolysis cell. In such an embodiment, the inlet 212 is configured to receive liquid phase water.

The bottle 210 further includes one or more light ports 225 located on or near the wall's outer surface 215 and operable to guide light of a predefined wavelength(s) therethrough into the interior region 217. The light ports 225 may connect to a transmission medium, such as a fiber optic cable, or may itself comprise a light that generates the light to be injected into the interior region 217. In the preferred embodiment, the light ports comprise fiber optic cables coupled to one or more remotely light sources operating at one or more wavelengths between 1500 nm and 246 nm. In a further preferred embodiment, the aforementioned light source is a laser diode operating in the range of 820 nm, examples of which are available from Power Technology Incorporated of Little Rock, Ark. Of course, other light sources such as conventionally known lasers (gas, solid state, etc.), light emitting diodes, lamps, and natural sources such as solar radiation may be used alternatively, or in addition in alternative embodiments under the present invention.

The bottle 210 preferably includes an optically reflective coating disposed on the wall's outer surface 215 which is operable to reflect light of one or more wavelengths back into the interior region 217. Dissociation efficiency is enhanced by reflecting light within the interior region 217 one or more times, as will be further described below. In the preferred embodiment, the reflective coating is operable to reflect light between 1500 nm and 150 nm, and further preferably between 850 nm and 150 nm. Various materials may be used. In one embodiment, bare aluminum, which may form the bottle wall 218 is used to provide the desired reflectivity. In the exemplary embodiment in which the bottle is constructed from fused quartz silica, the reflective coating may consist of a di-electric metal oxide, such as hafnium dioxide, silicon dioxide, aluminum oxide, and similar materials. The reflective coating may be patterned around the light ports 225 so as to permit injection of the light signal into the interior region 217. In the preferred embodiment, the bottle wall 218 includes an undulated outer and/or inner surface, as will be described in greater detail with reference to FIGS. 3A and 3B below.

The bottle 210 additionally includes a cathode 232 located proximate to the $H_2$ outlet, and an anode located proximate to the $O_2$ outlet. The cathode and anode 232 and 238 are negatively and positively charged electrodes, respectively, which are operable to liberate the positively charged $H_2$ molecules and negatively charged $O_2$ molecules. Either electrode may be located within the interior region 217 of the bottle 210, or on/proximate to the bottle wall's outer surface 215. In the latter case, the electrode's voltage potential is electrically-coupled (electrostatically or electromagnetically) through the wall 218 to the interior region 217 to liberate the $H_2$ or $O_2$ molecules therein. The latter implementation is particularly advantageous, as the externally located electrodes exhibit longer life cycles, require less maintenance, and are more conveniently replaced. In a specific embodiment, the cathode 232 and anode 238 consist of Schottky barrier rectifiers. Those skilled in the art will readily appreciate that electrodes of alternative construction may be used in other embodiments under the present invention.

The bottle 210 further includes an RF port 242 located on or near the wall's outer surface 215, the RF port being configured to electromagnetically couple an RF (radio frequency) signal of predefined frequency(ies) into the interior region 217. In one embodiment, the freguency(ies) of the supplied RF signal is selected to substantially match the resonant frequency(ies) of the acidic water vapor molecule so as to inhibit recombination of the $H_2$ and $O_2$ molecules after dissociation. In a second embodiment, the amplitude and frequency of the RF signal is selected so as to bombard the $H_2$ and $O_2$ constituents with ionizing radiation, thereby maintaining their present dissociated state. The RF port 242 may comprise any conventional structure operable to launch the desired RF frequency(ies) signal into the interior region 217, such structures including a TEM (transverse electromagnetic) structure such as coaxial cable, or TE (transverse electric) or TM (transverse maenetic) structures, such as a waveguide. Further alternatively, the RF port 242 may itself comprise a RF signal source itself which produces a signal (or signals) substantially at the desired amplitude and frequency(ies). In a specific embodiment, the RF port 242 comprises a variable oscillator (such as a voltage controlled oscillator) which can be set to output one frequency or a range of frequencies, preferably between 5 GHz and 96 GHz at amplitudes ranging up to 25 watts, and more preferably at 48 GHz and 0.5 to 5 watts.

Figure 3A:
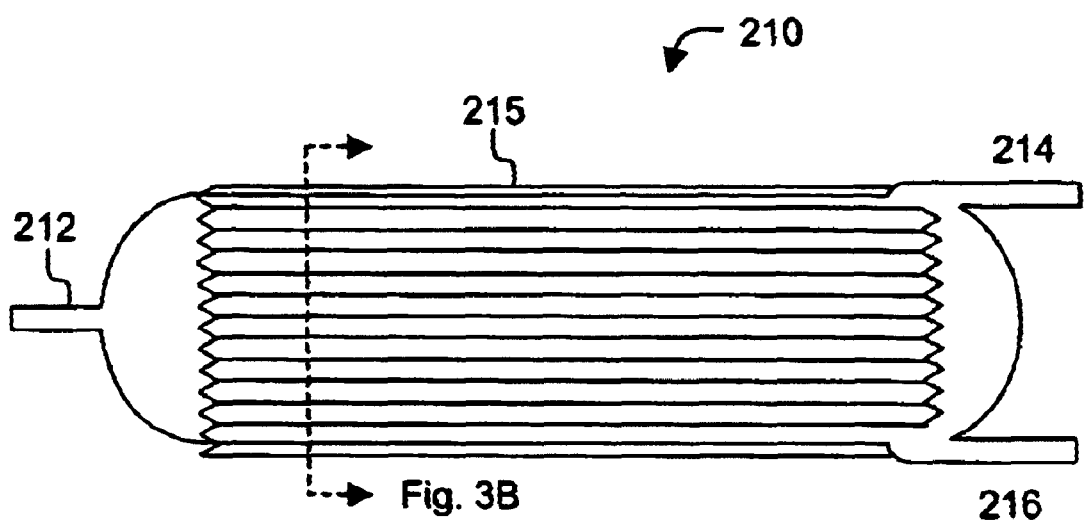
FIGS. 3A and 3B illustrate side and cross-sectional views, respectively, of a photolysis bottle in accordance with one embodiment of the present invention.
Figure 3B:
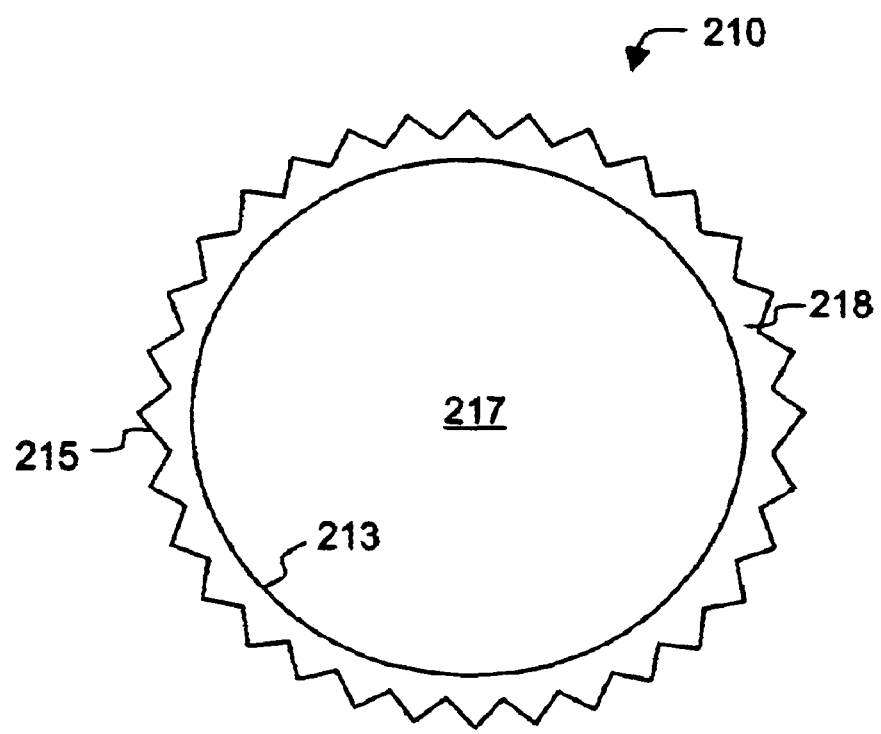

FIGS. 3A and 3B illustrate side and cross-sectional views, respectively, of a specific embodiment of the photolysis bottle in accordance with the present invention. As shown, the bottle wall 218 includes an undulated outer surface 215 (viewed cross-sectionally). In particular, the shape is corrugated, having edges which are formed by 45° angles, thereby shifting the incident angle of light reflecting thereupon from 0° to 45°. When the above-described optically reflective coating is deposited on the wall's outer surface 215, the light reflected therefrom will exhibit a wavelength approximately 10% shorter as described in the publication "The Photonics Design and Applications Handbook," 48th International Ed., 2002, published by Photonics Spectra., herein incorporated by reference. Accordingly, longer wavelength light can be injected into the interior region 217 and be converted to shorter wavelengths by reflecting the supplied light one or more times within the interior region 217. In a specific embodiment, a 820 nm light source is used to supply the initial light wave, the injected light undergoing 12 reflections to reach an effective wavelength of 233 nm to more efficiently dissociate $H_2$ and $O_2$ from the acidic water vapor. Of course, other arrangements are possible in which light of longer or shorter wavelengths are supplied and correspondingly a larger or smaller number of reflections are needed to reach the 246 nm dissociation threshold. The wall's surface geometry is not limited to the particular corrugated surface shown, and other undulated-shaped surfaces (e.g., corrugations formed at other angles, smooth corrugations, etc.) may be employed in alternative embodiments. Further alternatively, the undulated surface may be formed on the inside surface 213 of the bottle wall 218, with the wall's outer surface being relatively flat, or still alternatively, the undulated feature may be formed on both the inner and outer surfaces. Additionally, the optically reflective coating may be deposited on either the inside or outside surfaces of the bottle wall 218 to provide the requisite wavelength conversion. In embodiments in which the undulated surface is formed on the inside surface 213 of the bottle wall 218, the optically reflective coating may be deposited on the inside surface 213 if it is resistant to the corrosive effects of the acidic water vapor.

Figure 4:
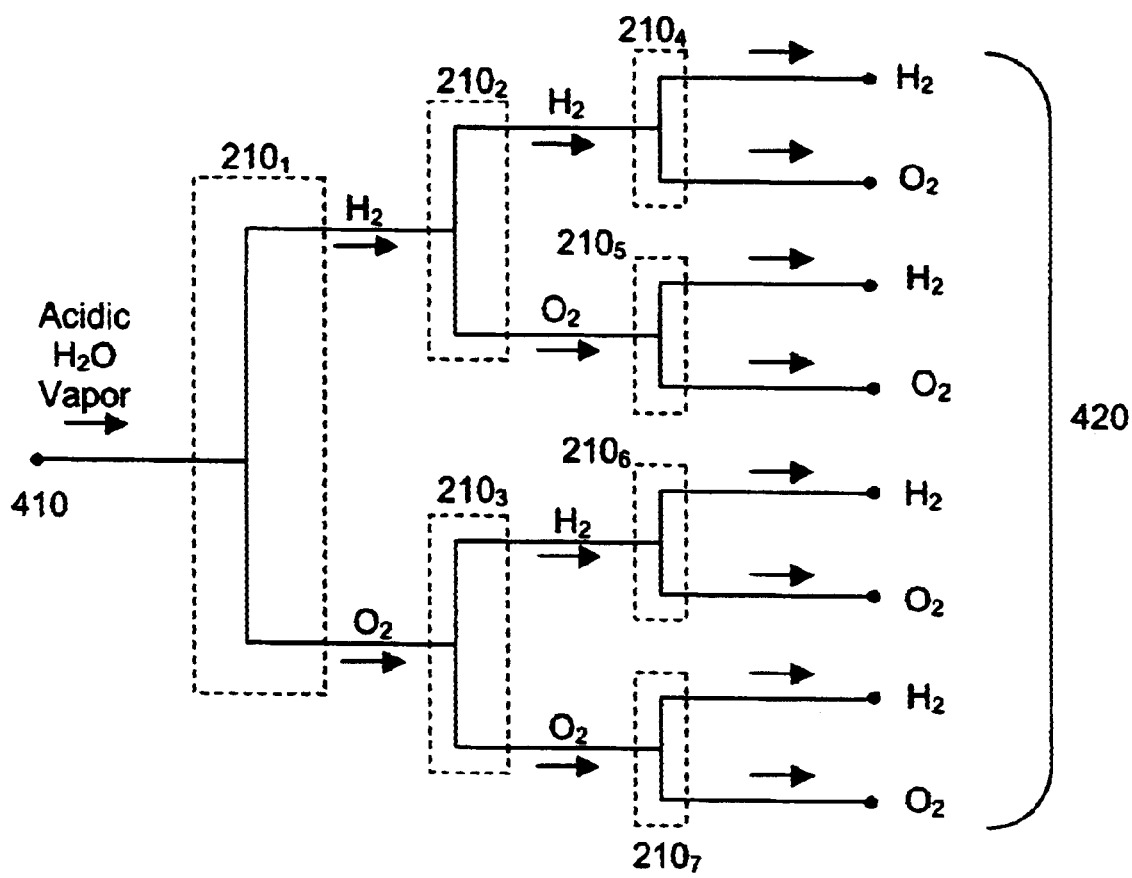
FIG. 4 illustrates a multi-stage photolysis cell in accordance with one embodiment of the present invention.

FIG. 4 illustrates a multi-stage photolysis cell 400 in accordance with one embodiment of the invention. The multi-stage cell 400 provides higher purity $H_2$ and $O_2$ gas 420 as the non-dissociated water vapor and subsequent spur reactions contained in previous processing steps is reduced in successive stages.

The illustrated embodiment shows a three-stage, seven cell arrangement in which an initial water vapor input 410 is processed into high purity $H_2$ and $O_2$ gas 420. The photolysis cells are coupled (i.e., connected either directly or via one or more interposed elements) to the preceding bottle's outlet port. The first stage consists of a single cell $210_1$, which feeds each of two second-stage cells $210_2$ and $210_3$, each of which, in turn, feeds four third-stage cells $210_4$–$210_7$. In each successive stage, non-dissociated water vapor contained in the $H_2$ or $O_2$ output is further reduced. In this manner, the $H_2$ and $O_2$ gas provided at the output 420 is of high purity. Each of the corresponding $H_2$ and $O_2$ outputs can be combined and stored, used to power the system's fuel cells, or otherwise processed as required.

Each of the illustrated cells may comprise the aforementioned photolysis cells 210 described above, or their alternatives. Further, all of the cells may be identical in construction and operation, or alternatively, there may be variation, for instance, as to bottle size and construction, photonic operation (e.g., variation in wavelengths used), and/or RF signal operation (e.g., variation in amplitude or frequency of the RF signal, if employed). In a particular embodiment, the first stage cell is substantially 3 liters in volume, the second stage cells are 1.5 liters, and the third stage cells are 1.0 liters in volume, each cell operating under substantially the same photonic and RF signal conditions, i.e., are provided substantially the same wavelength of light and RF signal frequency.

The foregoing embodiments are provided to illustrate specific aspects of the invention and are not intended to provide, nor do they legally establish the boundaries of the present invention, the metes and bounds of which are hereby established by the following claims:

What is claimed is:

1. An ultra-fast photodissociation system, comprising:
    a water acidifier having an inlet for receiving water from a water supply and an outlet, the water acidifier operable to acidify the supplied water to produce acidic water;
    a water vaporizer having an inlet coupled to the outlet of the water acidifier for receiving the acidic water and an outlet, the water vaporizer configured to convert the received acidic water into acidic water vapor; and
    a photolysis cell having an inlet coupled to the outlet of the water vaporizer for receiving the acidic water vapor, the photolysis cell configured to dissociate the acidic water vapor into $H_2$ and $O_2$ gas.

2. The ultra-fast photodissociation system of claim 1, wherein the water acidifier comprises a reverse osmosis filter.

3. The ultra fast photodissociation system of claim 1, wherein the water vaporizer comprises:
    a molten carbonate fuel cell operable to generate heat; and
    a heat exchanger having a water intake in fluid communication with the water acidifier for receiving the acidic water, a heat intake in communication with the heat exchanger for receiving the generated heat; and a water vapor output for supplying the acidic water vapor.

4. The ultra-fast photodissociation system 1, wherein the photolysis cell comprises a photolysis bottle having an inlet configured to receive the acidic water vapor, an $H_2$ outlet configured to output $H_2$, and a $O_2$ outlet configured to output $O_2$, the photolysis bottle having an inner region in contact with the acidic water vapor, and an outer surface.

5. The ultra-fast photodissociation system of claim 1, wherein the outer surface of the photolysis bottle comprises an undulated surface, and wherein an optically reflective coating is disposed on the undulated outer surface.

6. The ultra-fast photodissaciation system of claim 1, wherein the photolysis cell further comprises an RF port configured to couple an RF signal into the interior region of the photolysis bottle.

7. A photolysis cell configured to dissociate water molecules into $H_2$ and $O_2$ gas, the photolysis cell comprising:
    one or more photolysis bottles, each having an inlet configured to receive water molecules, an $H_2$ outlet configured to output $H_2$ gas, and a $O_2$ outlet configured to output $O_2$ gas, each of the one or more photolysis bottles further comprising:
        an undulated bottle wall defining an interior region of the photolysis bottle; and
        an optically reflective coating disposed on the undulated bottle wall, wherein the optically reflective coating is operable to reflect light back within the interior region of the photolysis bottle, and to effectively reduce the wavelength of the light reflected therefrom.

8. The photolysis cell of claim 7, further comprising one or more light ports located on or proximate to the undulated bottle wall of each of the one or more photolysis bottles, each of the one or more light ports configured to inject a light signal into the interior region of each of the one or more photolysis bottles.

9. The photolysis cell of claim 7, further comprising one or more light sources coupled to the one or more light ports, wherein each of the one or more light source generates a light signal at one or more wavelengths between 1500 and 246 nm in wavelength.

10. The photolysis cell of claim 9, wherein the one or more light sources comprises a laser diode.

11. The photolysis cell of claim 9, wherein the optically reflective coating is reflective to light between 1500 nm and 150 nm in wavelength.

12. The photolysis cell of claim 7, wherein the one or more photolysis bottles comprises three connected photolysis bottles, comprising:
    a first photolysis bottle having an inlet, an $H_2$ outlet, and an $O_2$ outlet;
    a second photolysis bottle having an inlet coupled to the $H_2$ outlet of the first photolysis bottle; a $H_2$ outlet; and an $O_2$ outlet; and
    a third photolysis bottle having an inlet coupled to the $O_2$ outlet of the first photolysis bottle; a $H_2$ outlet; and an $O_2$ outlet.

13. The photolysis cell of claim 12, further comprising:
    a fourth photolysis bottle having an inlet coupled to the $H_2$ outlet of the second photolysis bottle, a $H_2$ outlet, and an $O_2$ outlet;
    a fifth photolysis bottle having an inlet coupled to the $O_2$ outlet of the second photolysis bottle, a $H_2$ outlet, and an $O_2$ outlet;
    a sixth photolysis bottle having an inlet coupled to the $H_2$ outlet of the third photolysis bottle, a $H_2$ outlet, and an $O_2$ outlet; and
    a seventh photolysis bottle having an inlet coupled to the $O_2$ outlet of the third photolysis bottle, a $H_2$ outlet, and an $O_2$ outlet.

14. The photolysis cell of claim 7, wherein the optically reflective coating comprises bare aluminum or di-electric metal oxide.

15. The photolysis of claim 7, wherein the photolysis bottle is composed of fused quartz silica.

16. The photolysis cell of claim 7, further comprising one or more RF signal input ports configured to couple an RF signal into the interior of the photolysis bottle.

17. The photolysis cell of claim 16, further comprising an RF signal source coupled to the one or more RF signal inputs, wherein the RF signal source outputs an RF signal operating between 5 and 96 GHz.

18. The photolysis cell of claim 17, wherein the frequency of the RF signal substantially matches the resonant frequency of the vapor phase water molecules.

19. A photolysis cell configured to dissociate water molecules into $H_2$ $O_2$ gases, the photolysis cell comprising:
    one or more photolysis bottles, each having an interior region, an inlet configured to receive water molecules, an $H_2$ outlet configured to output $H_2$ gas, and an $O_2$ outlet configured to output $O_2$ gas, each of the one or more photolysis bottles comprising:
        a light port configured to pass a light signal into the interior region of the photolysis bottle; and
        an RF port configured to pass an RF signal into the interior region of the photolysis bottle.

20. The photolysis cell of claim 19, further comprising:
an anode located within the interior region of the photolysis bottle at the $O_2$ outlet, the anode configured to attract the negatively-charged $O_2$ gases; and
a cathode located within the interior region of the photolysis bottle at the $H_2$ outlet, the cathode configured to attract the positively-charged $H_2$ gases.

21. The photolysis cell of claim 19, further comprising:
an anode located outside of the interior region of the photolysis bottle and proximate to the $O_2$ outlet, the anode configured to attract the negatively-charged $O_2$ gases; and
a cathode located outside of the interior region of the photolysis bottle and proximate to the $H_2$ outlet, the cathode configured to attract the positively-charged $H_2$ gases.

22. The photolysis cell of claim 19, wherein the RF port is configured to pass RF signals within the range of 5 GHz–96 GHz.

23. The photolysis cell of claim 19, wherein the photolysis bottle has a volume ranging between 0.5–3.0 liters.

24. The phototysis cell of claim 19, wherein the photolysis bottle comprises an undulated bottle wall and a optical coating, wherein the optical coating is reflective to the wavelength of light passed into the interior region of the photolysis bottle.

25. The photolysis cell of claim 19, wherein the light port is configured to pass light at wavelengths of 246 nm or longer.

* * * * *